United States Patent [19]
Redman et al.

[11] 4,175,836
[45] Nov. 27, 1979

[54] METHOD AND APPARATUS FOR FORMING VISIBLE IMAGES

[75] Inventors: Michael J. Redman, Datchworth; David W. Satchell, Welwyn Garden City, both of England

[73] Assignee: Xerox Corporation, Stamford, Conn.

[21] Appl. No.: 784,492

[22] Filed: Apr. 4, 1977

[30] Foreign Application Priority Data

Aug. 31, 1976 [GB] United Kingdom .............. 36057/76

[51] Int. Cl.² .............................................. G02F 1/17
[52] U.S. Cl. ...................................... 350/357; 340/785
[58] Field of Search ................. 350/160 R, 357, 355; 340/324 R, 324 M, 763, 785

[56] References Cited

U.S. PATENT DOCUMENTS

| | | | |
|---|---|---|---|
| 3,864,589 | 2/1975 | Schoot et al. | 350/357 |
| 3,950,936 | 4/1976 | Oguey et al. | 340/324 R |
| 3,987,433 | 10/1976 | Kennedy | 350/160 R |
| 4,041,481 | 8/1977 | Sato | 350/355 |

*Primary Examiner*—James W. Davie

[57] ABSTRACT

A method and apparatus for causing coloration of an electrochromic material includes passing through the material an electrical pulse above a coloration threshold potential for the material and of a predetermined polarity and subsequently applying a D. C. potential of the same polarity to the material of a magnitude less than the threshold potential.

4 Claims, 3 Drawing Figures

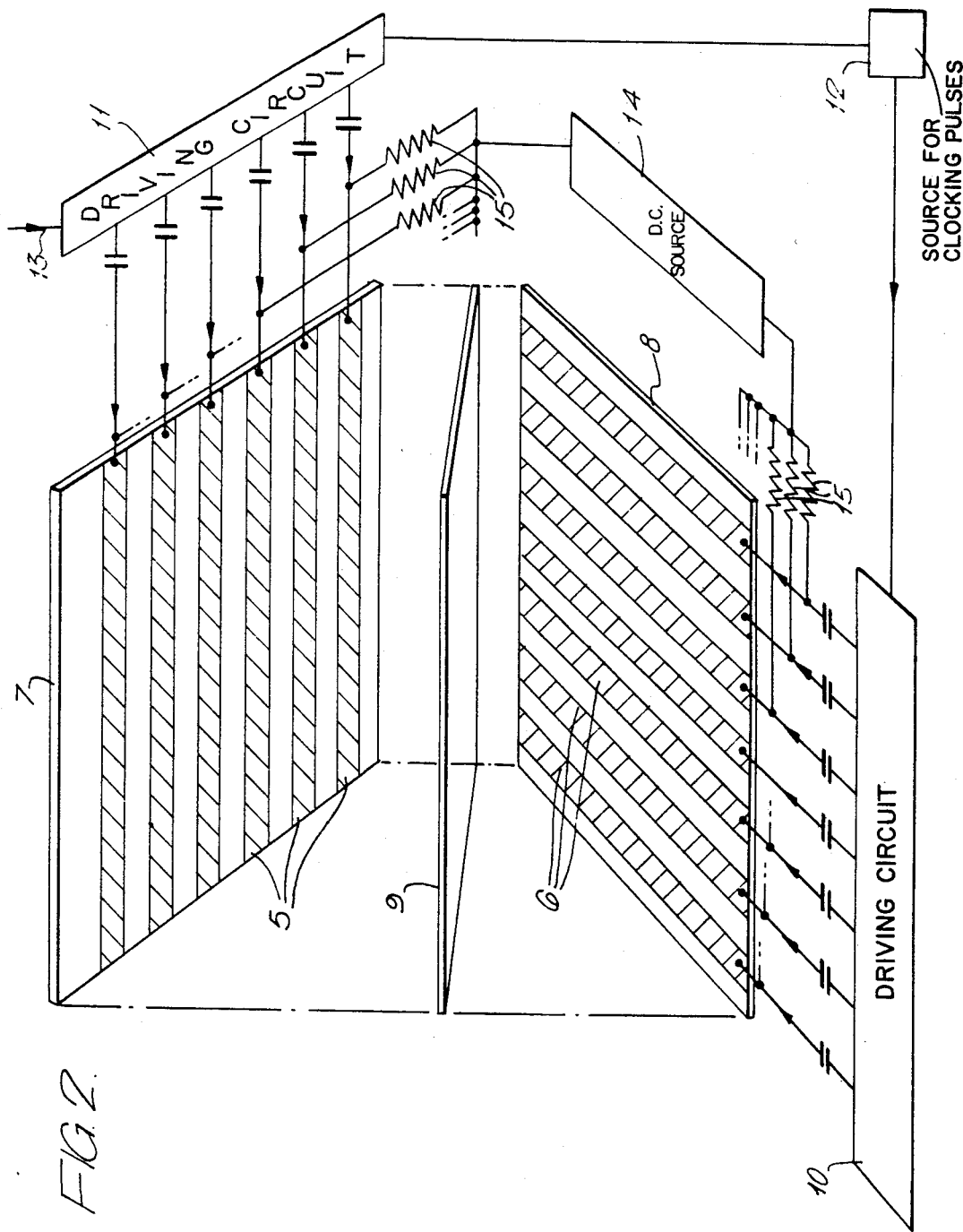

METHOD AND APPARATUS FOR FORMING VISIBLE IMAGES

BACKGROUND OF THE INVENTION

This invention relates to a method and apparatus for forming visible images, and in particular for forming visible images by the selective application of electrical potentials to an imaging material. A material in which visible images may be formed by chemically-produced color changes as a result of the selective use of electrical potentials, is hereinafter called an electrochromic material. With many electrochromic materials, the images are reversible, that is, they can be erased by applying a reverse potential to the imaging material.

Various imaging systems are known for reversibly forming visible images in this way. In one such system, a liquid electrochromic material is used as an imaging medium, and a set of first electrodes cooperate with one or more counter-electrodes to cause deposition of colored material onto selected ones of the first electrodes which have electrical potentials applied to them, to form an image. Typically, the first electrodes are transparent conductive members. Erasure is achieved either by the removal of the potentials and the passage of time, or by reversal of the potentials. One kind of electrode configuration which has been suggested for the first electrodes of such systems is the so-called 7-bar configuration, in which seven straight bars are arranged to form the general shape of a square-sided FIG. 8. By energizing selected ones of the bars, each of the numerals from 0 to 9 may be depicted.

In another known kind of electrode configuration, the electrodes used to selectively apply potentials across the material are in the form of two spaced sets of parallel conductive strips which overlie one another in an orthogonal matrix configuration. By applying potentials to the appropriate strip of each set, it is possible to address any point in the material defined by an intersection of two strips. By making each applied potential less than the coloration threshold potential for the material but greater than one half of the threshold potential, it is possible to cause coloration only at the selected intersection.

This latter configuration suffers from the disadvantage that in order to pass sufficient charge through the electrochromic material to cause coloration in a usefully short time, it is necessary to pass a large current pulse. Although this can be achieved, the necessary circuitry is expensive, and difficulty may be experienced in fabricating electrodes of sufficiently high conductivity to cope with such currents.

It is an object of the present invention to provide an improved imaging system which utilizes an electrochromic material and in which the above disadvantage is overcome. According to the present invention, there is provided a method of causing coloration of an electrochromic material comprising passing through the material an electrical pulse of a predetermined polarity which tends to cause coloration and at a potential above a coloration threshold potential for the material, and simultaneously or subsequently applying to said material a D.C. potential of said predetermined polarity and of magnitude less than said threshold potential.

According to another aspect of the invention, there is provided an apparatus for causing coloration of an electrochromic material comprising spaced electrodes in contact with an electrochromic material, means for passing between said electrodes an electrical pulse of a predetermined polarity which tends to cause coloration and at a potential above a coloration threshold potential for the material, and means for simultaneously or subsequently applying to said material a D.C. potential of said predetermined polarity and of magnitude less than said threshold potential.

SUMMARY OF THE INVENTION

A method of causing coloration of an electrochromic material comprising passing through the material an electrical pulse of a predetermined polarity which tends to cause coloration and at a potential above a coloration threshold potential for the material, and simultaneously or subsequently applying to said material a D.C. potential of said predetermined polarity and of magnitude less than said threshold potential.

BRIEF DESCRIPTION OF THE DRAWINGS

A method and apparatus for causing coloration of an electrochromic material in accordance with the invention will now be described, by way of example only, with reference to the accompanying drawings, in which:

FIG. 2 is an exploded perspective view of an apparatus for carrying out the method of the invention;

DESCRIPTION OF THE PREFERRED EMBODIMENT

Figure 1:
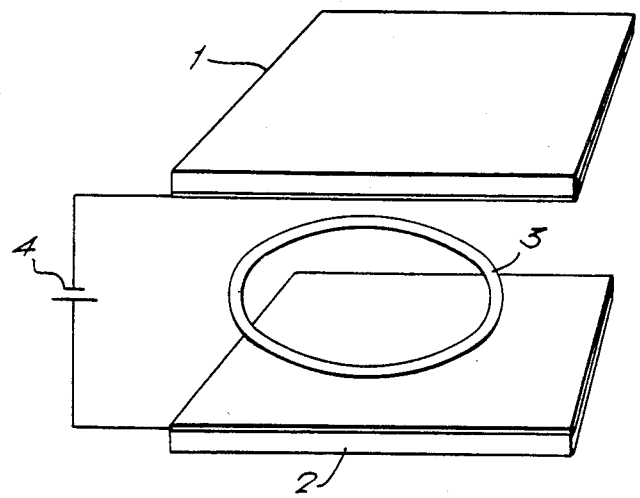
FIG. 1 is an exploded view of an electrochromic cell suitable for use in demonstrating the principle of the invention.

The method and apparatus of the invention utilize an electrochromic material, which material, as mentioned in the introductory part of the specification, is one which forms a visible image when electrical potentials are selectively applied across it. In practice, in order to make an image visible, it is only necessary for the material to change color; thus, if working with a white background, a material is particularly suitable if it is white or transparent in one state, but changes to some other color, preferably contrasting with white, in its other state. This electrochromic material may either be of an inorganic solid, for example, a transition metal compound such as tungsten oxide, or an organic liquid or solid such as one of the viologen derivatives.

Examples of transition metal compounds used as electrochromic materials may be found in U.K. patent specification No. 1,186,541. Examples of viologen derivatives used as electrochromic materials may be found in U.S. Pat. Nos. 3,712,709 and 3,930,717, as well as in U.S. Pat. Nos. 3,806,229 and 3,854,794. Particularly suitable compounds are N(p-cyanophenyl) substituted derivatives of bi-cyclic compounds having two conjugated nitrogen-containing aromatic rings.

As described in the above mentioned patent specifications, there are many derivatives of the bipyridyl group which exhibit color changes in response to electric current flow. The N(p-cyanophenyl) compound and especially N,N' di(p-cyanophenyl)-4,4' bipyridylium dichloride, is particularly useful in that it is reversibly electrolytically reduced on passage of a current in the appropriate direction to provide a radical which is colored, usually green, while the parent compound is colorless or pale yellow. Furthermore, in its reduced state, the material is almost completely insoluble, so that it stays on or adjacent one of the electrodes, without displaying the tendency of some of the viologens to redissolve in the absence of a reducing current. Thus, with the preferred compound, an image, once formed, tends to be stable even in the absence of any current, but will nevertheless disappear entirely under reverse current flow. It has also been found desirable to include with the electrochromic material a second reversibly oxidizable material, preferably ferrous ammonium sulphate. This provides a ferrous $\rightleftharpoons$ ferric ion combination in a particularly suitable form, improving the speed of bleaching on reversing the potential. It does, however, cause a certain amount of deterioration in the memory (i.e. the stability of the image in the absence of an electric current). This memory effect can be restored by the addition of, for example, an organic acid such as tartaric acid. Further examples of such additives are given in German OLS No. 2,511,314.

The examples of viologen-type electrochromic materials discussed above are normally used in a liquid form. In an alternative configuration, they may be used in solid form, typically as a layer of polymeric based material.

Referring now to FIG. 1, an electrochromic cell is formed between a front (transparent) electrode 1 and a rear, counter electrode 2. The front electrode 1 is of glass, and has on its inside surface a conductive coating of 100 tin oxide. The inside surface of the rear electrode 2 is of silver/silver chloride. The two electrodes are separated by a neoprene 'O' ring 3, and the intervening space is filled with a 0.005 M solution of N,N' di(p-cyanophenyl)-4,4' bipyrindylium dichloride in distilled water, with the addition of 0.5 M KCl to improve the conductivity.

If the cell is connected to a low voltage D.C. supply 4, such that the front electrode 1 is negative with respect to the rear electrode 2, a layer of green dye (the reduced form of the electrochromic material) builds up on the transparent electrode. The dye persists when the drive voltage is turned off, but may be removed by reversing the direction of the current flow. The build up and removal of coloration are relatively slow, usually taking tens of milliseconds, and requiring charges of up to ten millicoulombs cm-2.

The electrochromic material is found to have a relatively sharp coloration threshold voltage, below which no coloration occurs. This threshold effect means that display devices using the electrochromic material may be matrix addressed, for example as described in the introductory part of the specification. As an alternative to the D.C. method of causing coloration of an electrochromic material, it is found that significant coloration can also be caused by the passage of short duration pulses of current, provided that for a given degree of coloration, the total charge passed must be the same as in the D.C. case. Thus, typically between one and ten millicoulombs cm-2 need to be passed to produce significant coloration, and the pulse duration may be as short as 200 microseconds.

It has now been discovered that it is possible to cause coloration by passing a short duration pulse, which does not contain the total charge required for coloring, but which is above threshold voltage, through the cell. By subsequently or simultaneously applying a D.C. voltage below the amplitude of the threshold voltage across the cell it is possible to cause coloration. In this way, it is possible to employ a short duration pulse of relatively low current, which permits significantly simpler circuits to be used to provide the pulses and permits the use of electrodes which do not need to be of such high conductivity as when pulses alone are used. Neither the pulse nor the D.C. alone will produce any visible coloration, but when both are applied, the characteristic color will develop over several tens of milliseconds. Development will take place provided the D.C. voltage is applied within about ten seconds of the initiating pulse. The charge flowing from the pulse source under these conditions can be as low as twenty microcoulombs cm-2, passed in twenty microseconds. This effect is clearly particularly useful in matrix display devices, since it offers a substantial reduction in the pulse currents needed to be supplied by the column and row driving circuits. The development current could, for example, be supplied from a single D.C. source switched onto each of the column electrodes, through series resistances which isolate one column from another, after the display has been activated by known matrix address techniques.

Although the invention is in no way limited by a particular mode of operation, it is thought that coloration can be achieved in accordance with the invention by virtue of the fact that there is a change in the threshold characteristics of the cell after one monolayer of the reduced electrochromic material (i.e. the green insoluble dye) has been deposited on the cathode. The nominally sub-threshold D.C. voltage is then large enough to produce further reduction and hence more dye layers. Thus, the initial pulse deposits the monolayer (invisible to the eye) and the sub-threshold D.C. voltage causes a buildup of the coloration. Some evidence which points towards this explanation is as follows:

1. The open circuit potential of a cell which has been pulsed (with no D.C. and exhibiting no visible coloration) is initially the same as that measured for a cell which has been colored by the application of a D.C. potential. Over a period of about ten seconds, the open circuit potential of the pulsed cell reverts to that of a bleached cell, which suggests that the monolayer oxidizes off the cathode, back into solution, during this time.

2. There is not a similar effect for bleaching. Thus, a short duration pulse followed by a D.C. voltage less than the bleaching threshold voltage applied to a colored cell will not cause bleaching. This suggests that the pulse removes a monolayer of dye molecules, but does not change the underlying surface, or the cell potential 3. A theoretical estimate of the charge required to deposit a monolayer of dye is in close agreement with the measured charge deposited by a pulse just large enough to initiate coloration.

In summary, if a short current pulse at a potential above the coloration threshold potential is passed through the electrochromic material, and simultaneously or subsequently a sub-threshold D.C. voltage is applied, coloration develops as if the material had been connected to an above threshold D.C. voltage. Furthermore, the charge passed by the pulse can be up to two hundred times lower than that needed for coloration by pulse alone.

As mentioned earlier, the concept of a flat panel display device having two sets of mutually orthogonal electrodes so arranged that the intersections of the electrodes in the two sets form a two dimensional matrix of addressable points is well known. The display medium, situated at the intersections of the electrode strips of each set, may be any material or combination of materials which changes its ability to emit, scatter, absorb or polarize light in response to an applied voltage, or the passage of an electric current. In many such systems, a point in the matrix is addressed by applying half the potential required to activate the medium to each electrode strip of the pair which intersect at the point. In this way, only at the intersection is the full potential difference applied. All other points along each electrode strip experience half the potential required to activate the medium, and the medium must be such that is does not respond to this half potential. Addressing the various points as required to build up an image is achieved by selecting the appropriate electrodes by means of digital electronic circuits peripheral to the panel. These circuits may be formed using silicon technology, or may be deposited on the panel in the form of thin film transistors.

Referring now to FIG. 2, a display panel incorporating the present invention comprises two orthogonal sets 5 and 6 of parallel conducting electrode strips, the strips being supported on the facing surfaces of front and rear insulating plates 7 and 8, at least one of which is transparent to visible light. Located between the front and rear plates 7 and 8, and in contact with the electrode strips 5 and 6, is the electrochromic material, which may consist of a solution of a bipyridylium compound of the viologen type, with additional electrolytes, pH stabilizers and redox modifiers as necessary. A preferred compound is that described as suitable for use in the cell depicted in FIG. 1. The electrochromic solution may be absorbed in a porous separator as indicated at 9 in FIG. 2. This may be of, for example, a white material, in which case one of the front and rear plates 7 and 8 need not be transparent. The edges of the plates project outside the viewing area, and preferably carry fan-out and interconnection conductors integral with the connectors. To these are attached unpackaged silicon chips which make up the peripheral circuits.

For the purposes of explanation, the electrodes on the front plate 7 will be designated row electrodes, and those on the rear plate 8 will be designated column electrodes. The column (vertical) electrodes are driven by a driving circuit 10, and the row (horizontal) electrodes 5 are driven by driving circuit 11. The driving circuits 10 and 11 are clocked by a source 12 of clocking pulses, whereby the row and column circuits build up a visible image in accordance with a video input signal 13. Both the column and row drivers are arranged to give outputs of 0 and plus or minus one half of the drive voltage, for hold, write or erase. Alternatively, the erase potential may be provided separately from the pulse circuits.

As previously mentioned, the electrochromic materials described have a relatively sharp coloration threshold potential, so the row and column pulses must be at a potential between the threshold potential and half the threshold potential. The D.C. potential which is applied in accordance with the invention clearly needs to be less than the threshold potential otherwise it alone would cause coloration. It is found in practice that the best results are obtained if the D.C. potential is not far below the threshold potential. Thus, it is in practice desirable to apply the D.C. voltage after the initiating pulses have been applied, since, if the D.C. voltage was applied simultaneously with the pulses, development of a whole row or a whole column might take place. The D.C. potential is applied from a D.C. source 14 by way of a resistor 15 between the source and each of the row and column electrodes.

Figure 3:
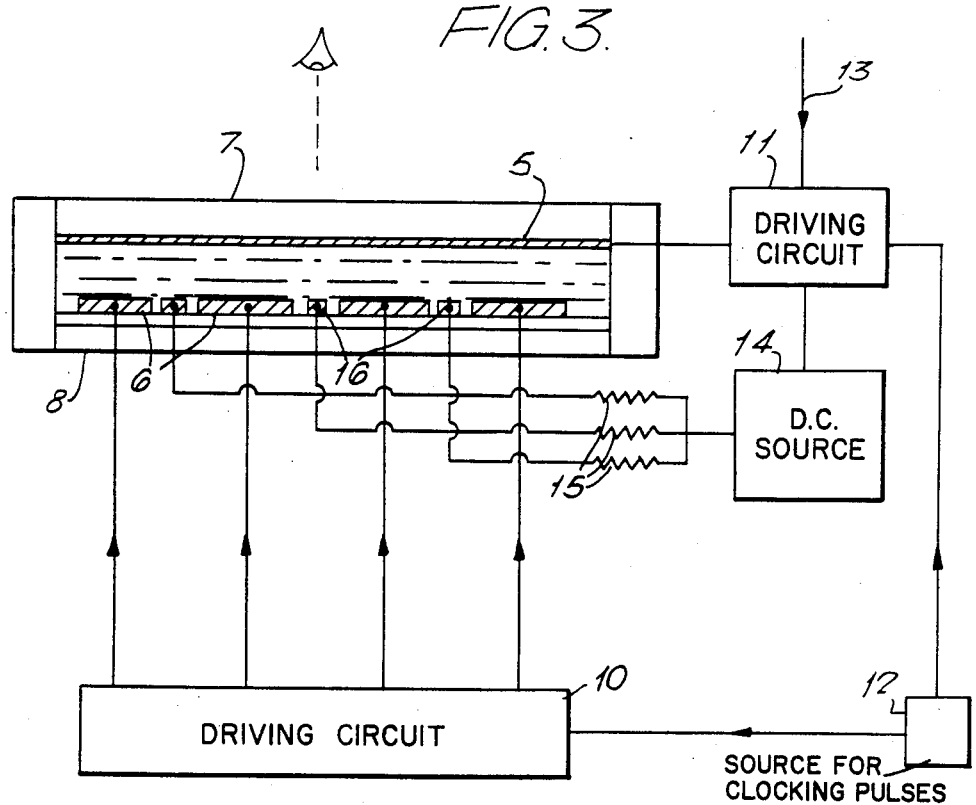
FIG. 3 is an exploded perspective view of an alternative embodiment.

In an alternative embodiment, shown in FIG. 3, the D.C. potential is applied by means of separate electrodes 16 which are here shown as being positioned in between each two adjacent column electrodes 6. The separate electrodes 16 can be in any position which results in the appropriate current flow. All other parts of the arrangement shown in FIG. 3 are the same as the arrangement of FIG. 2, and like parts have been numbered to correspond.

A matrix display panel using an electrochromic material which incorporates the present invention has a number of advantages, which will now be outlined, over other devices for a similar purpose. The image produced by the display panel utilizing the present invention is pleasing, consisting of dark green characters on a matte white background. The panel is a passive reflecting or transmitting device, giving good contrast at high ambient illumination. The panel is compact, especially in depth, and is comparatively cheap to manufacture. It can be driven by integrated digital silicon logic devices, it can have a long term memory consuming no power, and can function at "real time" speeds.

What is claimed is:

1. Apparatus for causing coloration of an electrochromic material comprising an electrochromic cell structure which comprises spaced electrodes with said electrochromic material sandwiched between and in contact with said electrodes, means for passing between said electrodes an electrical pulse of a predetermined polarity, for a minimum time of 200 microseconds, which causes coloration at a potential above a coloration threshold potential for the material, and means for simultaneously applying to said material a D.C. potential of said predetermined polarity and of magnitude less than said threshold potential, wherein said means for applying the D.C. potential comprises electrode means separate from said spaced electrodes.

2. The apparatus of claim 1 wherein said electrodes comprise separate first and second sets of elongate electrode elements with one set overlying the other in matrix configuration, the apparatus including means for applying electrical pulses of said predetermined polarity and at a potential less than said threshold potential to any one of the electrode elements of each set so as to apply an additive pulse at a potential greater than said threshold potential to a point in said material defined by the selected electrode elements, said means for applying a D.C. potential being arranged to apply said potential subsequently to the application of said pulses.

3. Apparatus for causing coloration of an electrochromic material comprising an electrochromic cell structure which comprises spaced electrodes with said electrochromic material sandwiched between and in contact with said electrodes, means for passing between said electrodes an electrical pulse of a predetermined polarity, for a minimum time of 200 microseconds, which causes coloration at a potential above a coloration threshold potential for the material, and means for subsequently applying to said material a D.C. potential of said predetermined polarity and of magnitude less than said threshold potential within a time interval of 10 seconds, wherein said means for applying the D.C. potential comprises electrode means separate from said spaced electrodes.

4. The apparatus of claim 3 wherein said electrodes comprise separate first and second sets of elongate electrode elements with one set overlying the other in matrix configuration, the apparatus including means for applying electrical pulses of said predetermined polarity and at a potential less than said threshold potential to any one of the electrode elements of each set so as to apply an additive pulse at a potential greater than said threshold potential to a point in said material defined by the selected electrode elements, said means for applying a D.C. potential being arranged to apply said potential subsequently to the application of said pulses.

* * * * *